(12) United States Patent
Kyeong

(10) Patent No.: US 8,594,154 B2
(45) Date of Patent: Nov. 26, 2013

(54) APPARATUS AND METHOD FOR TRANSMITTING AND RECEIVING SIGNAL IN MULTI-ANTENNA COMMUNICATION SYSTEM

(75) Inventor: Mun Geon Kyeong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 633 days.

(21) Appl. No.: 12/625,162

(22) Filed: Nov. 24, 2009

(65) Prior Publication Data

US 2010/0183052 A1    Jul. 22, 2010

(30) Foreign Application Priority Data

Nov. 25, 2008  (KR) .................. 10-2008-0117550
Nov. 24, 2009  (KR) .................. 10-2009-0113743

(51) Int. Cl.
*H04B 1/707*   (2011.01)

(52) U.S. Cl.
USPC .............................................. 375/146

(58) Field of Classification Search
USPC ......... 375/130, 146–148, 267, 295, 316, 343, 375/350; 455/103
See application file for complete search history.

(56) References Cited

U.S. PATENT DOCUMENTS

| | | | | |
|---|---|---|---|---|
| 5,729,570 A * | 3/1998 | Magill | ........................... | 375/149 |
| 6,061,342 A * | 5/2000 | Tsubouchi et al. | ........... | 370/342 |
| 6,122,309 A * | 9/2000 | Bergstrom et al. | ........... | 375/130 |
| 6,393,077 B1 * | 5/2002 | Usui | ............................. | 375/343 |
| 6,618,429 B2 * | 9/2003 | Gilhousen et al. | ............ | 375/141 |
| 7,046,978 B2 * | 5/2006 | Burke et al. | .................. | 455/272 |

FOREIGN PATENT DOCUMENTS

| EP | 0797315 B1 | 9/2003 |
|---|---|---|
| KR | 2008-0050211 | 6/2008 |

OTHER PUBLICATIONS

Esmailzadeh, R., et al., "Pre-Rake Diversity Combination for Direct Sequence Spread Spectrum Communications Systems", Proceedings of the International Conference on Communications (ICC), IEEE: 3, ISBN 0-7803-0950-2, May 23, 1993, 463-467.*

Sourour, E., "The Performance of TDD/CDMA systems using Pre-Rake Combining with Different Diversity Techniques and Imperfect Channel Estimation", Proceedings $2^{nd}$ ISCC'97, pp. 280-284, Jul. 1997.

Usuda, K., "Pre-Rake Performance for Pulse Based UWB System in a Standardized UWB short-range channel," Conference WCNC'04, vol. 2, pp. 920-925, Mar. 2004.

* cited by examiner

*Primary Examiner* — Khanh C Tran
(74) *Attorney, Agent, or Firm* — Staas & Halsey LLP

(57) ABSTRACT

Provided is a method and apparatus for transmitting and receiving a signal in a multi-antenna communication system. A method of transmitting a signal via a multipath channel in the multi-antenna communication system may include: generating continuous orthogonal spreading codes; spread-modulating a user signal using the continuous orthogonal spreading codes to generate a spread signal; performing pre-rake combining of the spread signal to generate a pre-rake synthesized signal; and transmitting the pre-rake synthesized signal via multiple antennas.

8 Claims, 6 Drawing Sheets

APPARATUS AND METHOD FOR TRANSMITTING AND RECEIVING SIGNAL IN MULTI-ANTENNA COMMUNICATION SYSTEM

CROSS-REFERENCE TO RELATED APPLICATION

This application claims the benefit of Korean Patent Application No. 10-2008-0117550, filed on Nov. 25, 2008 and Korean Patent Application No. 10-2009-0113743, filed on Nov. 24, 2009 in the Korean Intellectual Property Office, the disclosure of which is incorporated herein by reference.

BACKGROUND

1. Field of the Invention

The present invention relates to a method and apparatus for transmitting and receiving a signal in a multi-antenna communication system, and more particularly, to a method and apparatus for transmitting and receiving a signal using a pre-rake scheme.

2. Description of the Related Art

When an existing pre-rake transmission scheme is applied to a base station of a Code Division Multiplexing (CDM)/Code Division Multiple Access (CDMA) system using a Time Division Duplex (TDD) scheme, a terminal may achieve the equivalent multipath diversity effect to a rake receiver without using a separate diversity synthesis circuit.

The pre-rake transmission scheme may transmit signals using a relatively large number of paths compared to a general CDM/CDMA scheme that transmits signals using a single path. Therefore, the pre-rake transmission scheme may be significantly affected by multi-path interference (MPI) or multiple access interference (MAI) corresponding to a principal interference problem of a radio communication system. Accordingly, when the pre-rake transmission scheme is applied to the radio communication system, a bit error rate (BER) performance of the radio communication system may be significantly deteriorated, which may result in decreasing a data reception rate.

To overcome the above interference problem, an interference cancellation unit may be needed to be additionally installed in the radio communication system. However, an effective interference cancellation technology does not currently exist. In addition, an interference cancellation technology may not be easily realized and may increase a load on hardware. Accordingly, advantages of pre-rake used to simplify a configuration of a terminal may not be utilized.

SUMMARY

An aspect of the present invention provides a method and apparatus for transmitting and receiving a signal in a multi-antenna communication system.

Another aspect of the present invention also provides a method and apparatus for transmitting and receiving a signal using a pre-rake scheme in a multi-antenna communication system.

Another aspect of the present invention also provides a method and apparatus for transmitting and receiving a signal in a multi-antenna communication system that may cancel a multiple access interference (MAI) signal and a multipath interference (MPI) signal when the MAI signal and the MPI signal have an orthogonal characteristic and exist within a predetermined time interval.

Another aspect of the present invention also provides a receiver of a multi-antenna communication system applying a pre-rake scheme with respect to spreading codes having a characteristic of being continuously orthogonal for a predetermined time interval, and applying a use of multiple antennas for an interference cancellation and a high-rate transmission. The receiver may achieve the same bit error rate (BER) characteristic without using an interference cancellation unit such as a Multi-User Detection (MUD) system and a channel estimation portion for demodulation. Accordingly, the receiver may not need a channel estimator and a complex interference cancellation unit.

Another aspect of the present invention also provides a multi-antenna communication system applying a pre-rake scheme with respect to spreading codes having a characteristic of being continuously orthogonal for a predetermined time interval, and using multiple antennas to be applicable in an interference cancellation and a high-rate transmission. The multi-antenna communication system may construct an intra cell so that MAI may significantly decrease or become zero.

Another aspect of the present invention also provides a multi-antenna mobile communication system applying a pre-rake scheme with respect to spreading codes having a characteristic of being continuously orthogonal for a predetermined time interval, and applying a use of multiple antennas for an interference cancellation and a high-rate transmission. Here, a length of the predetermined time interval having the continuous orthogonal characteristic may be designed to traverse a major delay path length of MPI.

According to an aspect of the present invention, there is provided a method of transmitting a signal via a multipath channel in a multi-antenna communication system, the method including: generating continuous orthogonal spreading codes; spread-modulating a user signal using the continuous orthogonal spreading codes to generate a spread signal; performing pre-rake combining of the spread signal to generate a pre-rake synthesized signal; and transmitting the pre-rake synthesized signal via multiple antennas.

According to another aspect of the present invention, there is provided a method of receiving a signal via a multipath channel in a multi-antenna communication system, the method including: receiving, via the multipath channel, a pre-rake synthesized signal that is pre-rake combined using at least one antenna; and performing matched filtering of the pre-rake synthesized signal with respect to at least one path.

According to still another aspect of the present invention, there is provided an apparatus for transmitting a signal via a multipath channel in a multi-antenna communication system, the apparatus including: a continuous orthogonal spreading code generator to generate continuous orthogonal spreading codes; a spread-modulator to spread-modulate a user signal using the continuous orthogonal spreading codes, and to generate a spread signal; a pre-rake combiner to perform pre-rake combining of the spread signal, and to generate a pre-rake synthesized signal; and a transmitter to transmit the pre-rake synthesized signal via multiple antennas.

According to yet another aspect of the present invention, there is provided an apparatus for receiving a signal via multipath channel in a multi-antenna communication system, the apparatus including: a receiver to receive, via the multipath channel, a pre-rake synthesized signal that is pre-rake combined using at least one antenna; and a matched filter to perform matched filtering of the pre-rake synthesized signal with respect to at least one path.

Effect

According to embodiments of the present invention, there may be provided a multi-antenna communication system applying a pre-rake scheme with respect to spreading codes having a characteristic of being continuously orthogonal for a predetermined time interval, and using multiple antennas to be applicable in an interference cancellation and a high-rate transmission. The multi-antenna communication system may generate spreading codes that become zeros within a predetermined time interval, and thereby cancel interference while not increasing a system complexity.

In a system using an existing pre-rake scheme, multipath interference (MPI) and multiple access interference (MAI) may increase due to multiple paths. Therefore, a bit error rate (BER) performance may be deteriorated in comparison to a general system using a rake receiver. However, according to embodiments of the present invention, it is possible to decrease a BER, and to provide an excellent low noise performance by applying a pre-rake scheme with respect to Spreading codes having a characteristic of being continuously orthogonal for a predetermined time interval, and at the same time, by applying a beamforming weight vector or channel vector to multiple antennas.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
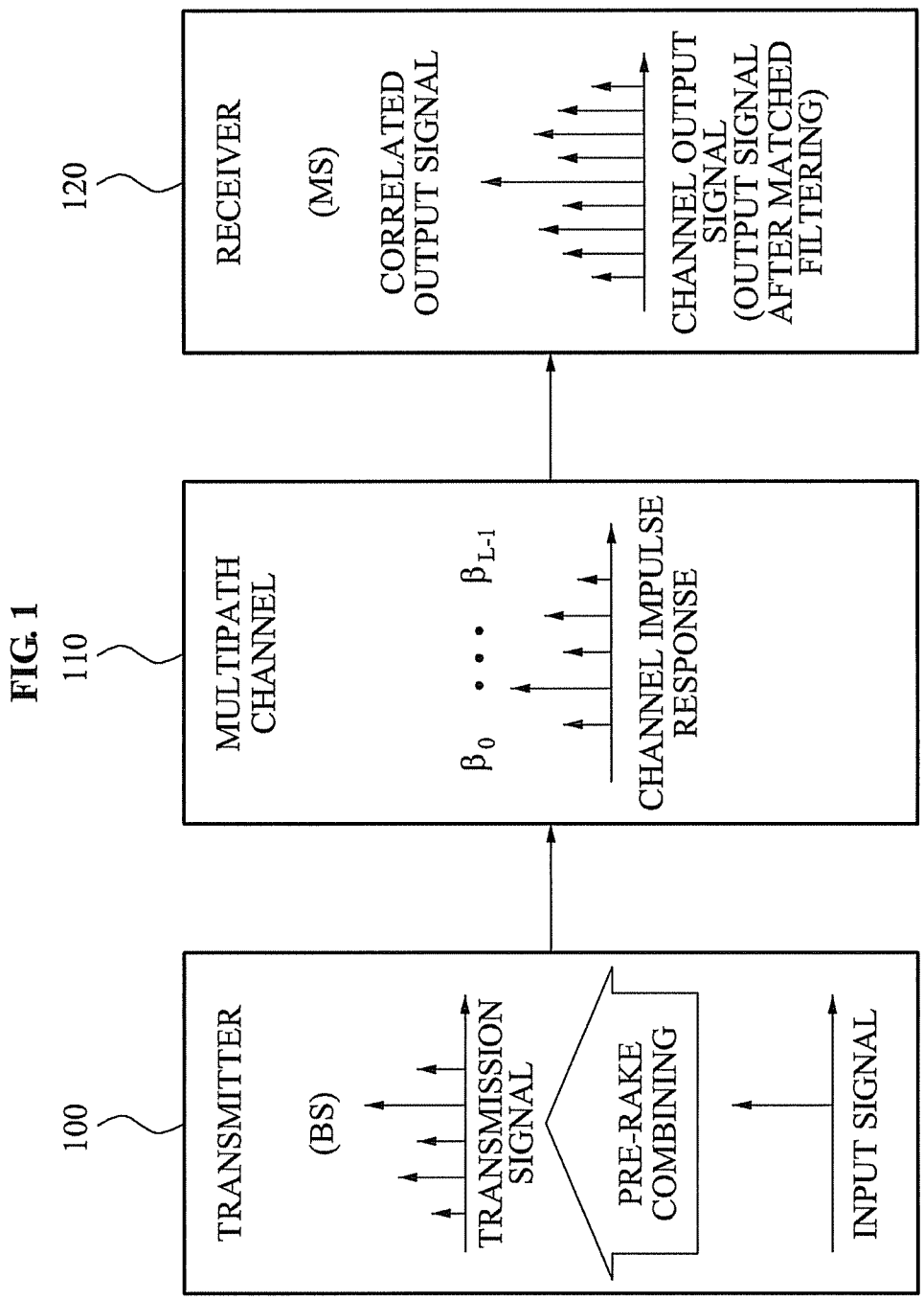
FIG. 1 is a diagram illustrating a multi-antenna communication system according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, embodiments of the present invention will be described in detail with reference to the accompanying drawings. When it is determined detailed description related to a known function or configuration they may render the purpose of the present invention unnecessarily ambiguous in describing the present invention, the detailed description will be omitted here.

FIG. 1 is a diagram illustrating a multi-antenna communication system according to an embodiment of the present invention.

Figure 2:
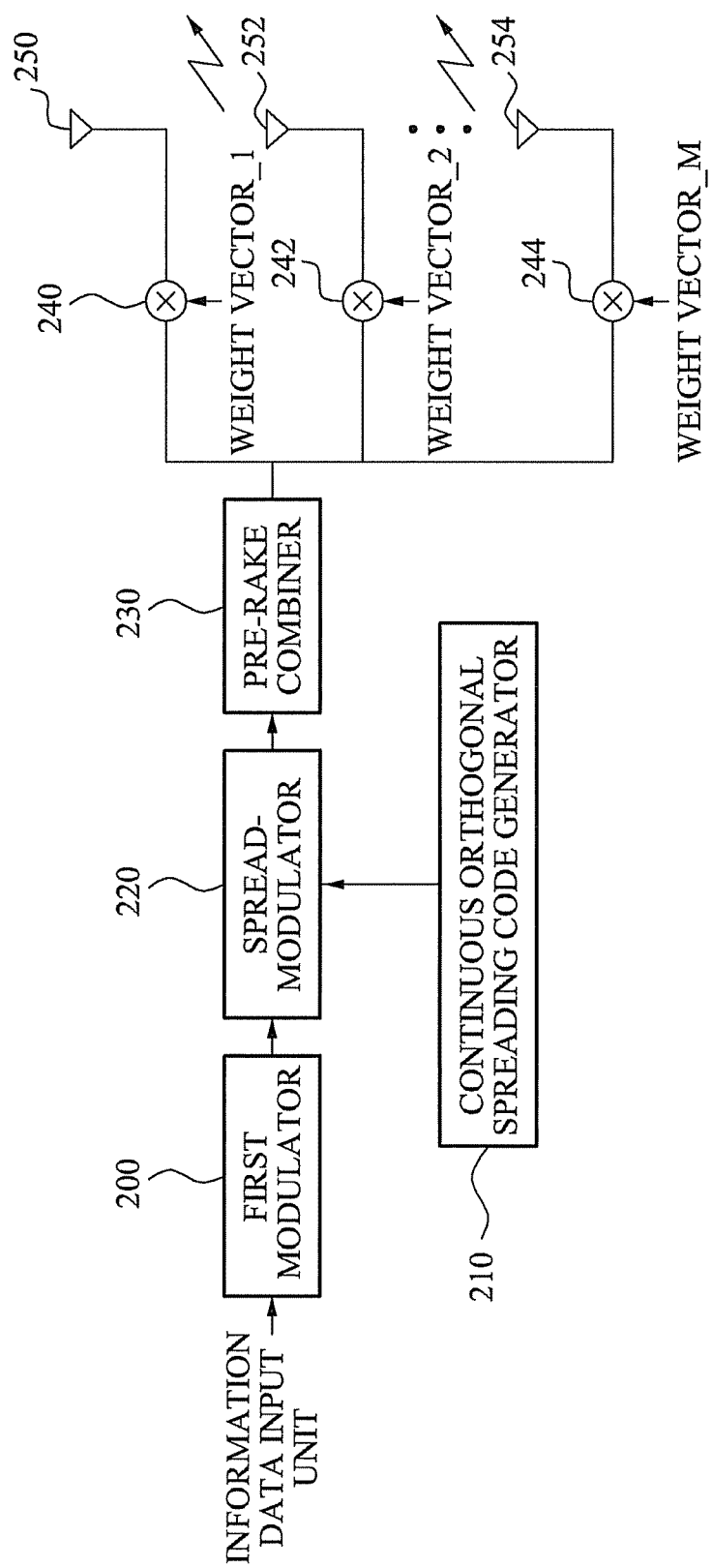
FIG. 2 is a block diagram illustrating a configuration of a transmitter included in a multi-antenna communication system according to an embodiment of the present invention.

Referring to FIG. 1, the multi-antenna communication system may include a transmitter 100 and a receiver 120 that are connected to each other via a multi-path channel 110. The transmitter 100 may be provided in a base station (BS), and may spread-modulate an input signal and then perform pre-rake combining of the spread-modulated input signal to thereby transmit the input signal. The receiver 120 may be provided in a terminal (MS), and may receive a signal from the transmitter 100 via the multipath channel 110 to thereby restore a received signal FIG. 2 is a block diagram illustrating a configuration of a transmitter included in a multi-antenna communication system according to an embodiment of the present invention.

The multi-antenna communication system may apply a pre-rake scheme with respect to spreading codes having a characteristic of being continuously orthogonal for a predetermined time interval, and use multiple antennas to be applicable in an interference cancellation and a high-rate transmission. Referring to FIG. 2, the multi-antenna communication system may include a first modulator 200, a continuous orthogonal spreading code generator 210, a spread-modulator 220, a pre-rake combiner 230, a plurality of multipliers 240, 242, and 244, and a plurality of antennas 250, 252, and 254.

The first modulator 200 may perform a data modulation process, and may apply various types of digital modulation schemes, for example, a phase shift keying (PSK) modulation scheme, a quadrature phase shift keying (QPSK) modulation scheme, a quadrature amplitude modulation (QAM) scheme, and the like.

The continuous orthogonal spreading code generator 210 may generate spreading codes (hereinafter, "continuous orthogonal spreading codes") having a characteristic of being continuously orthogonal for a predetermined time interval. The spread-modulator 220 may spread-modulate a data symbol value that is modulated in the first modulator 200.

The pre-rake combiner 230 may perform pre-rake combining of a spread-modulated spread signal to thereby generate a pre-rake synthesized signal, and transmit the pre-rake synthesized signal via the plurality of antennas 250, 252, and 254. Specifically, the pre-rake combiner 230 may combine the spread-modulated spread signal and a channel impulse response with respect to a multipath channel to thereby convert the spread signal to the pre-rake synthesized signal. Here, a combination of the channel impulse response may indicate that a complex conjugate value of a time-inverted value of the channel impulse response is applied to the spread signal.

A transmission signal passing through the pre-rake combiner 230 may be multiplied by a weight vector using the multipliers 240, 242, and 244 corresponding to the plurality of antennas 250, 252, and 254, respectively, and thereby be transmitted. When a high speed transmission is needed, the transmission signal may be multiplied by a channel coefficient vector that is estimated for each of the plurality of antennas 250, 252, and 254.

Figure 3:
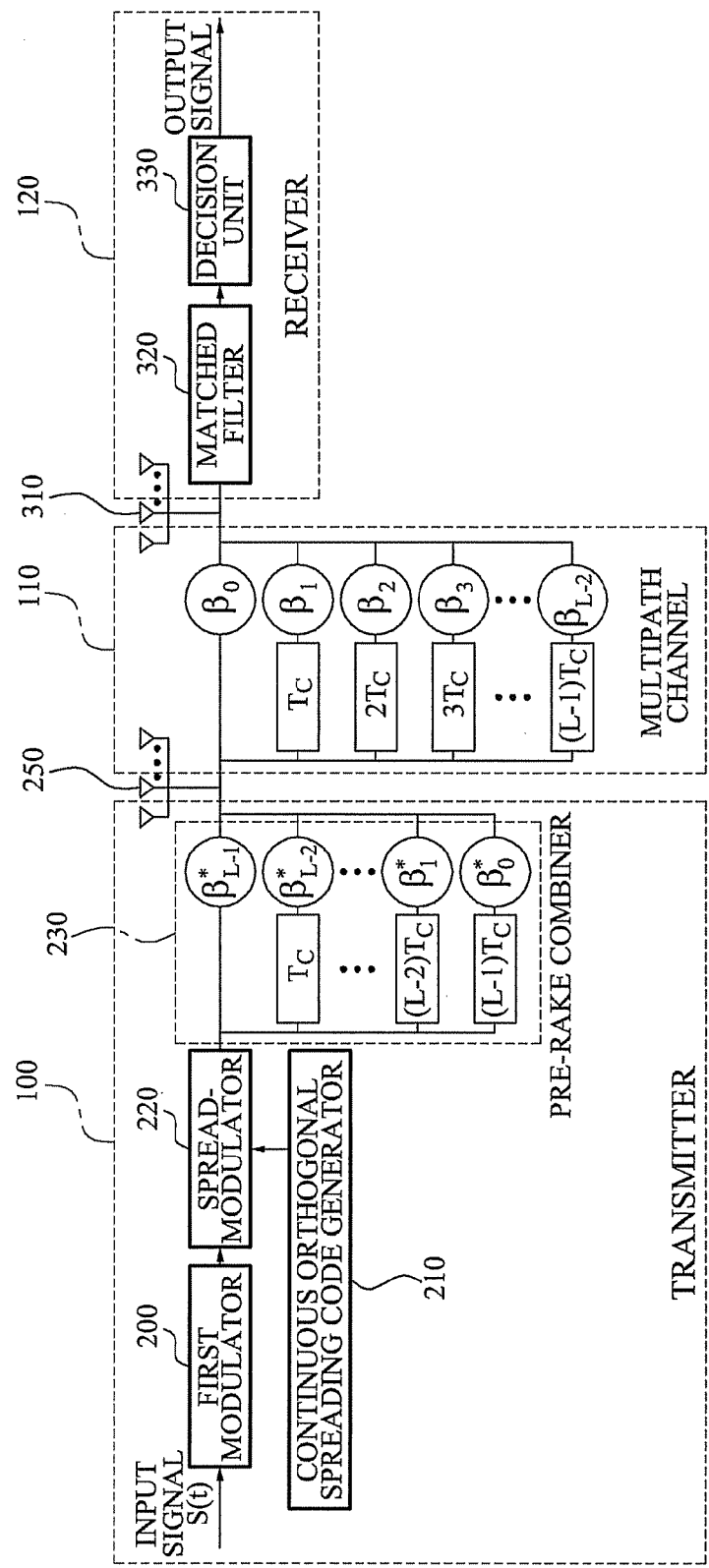
FIG. 3 is a block diagram illustrating a configuration of a multi-antenna communication system according to an embodiment of the present invention.

FIG. 3 is a block diagram illustrating a configuration of a multi-antenna communication system according to an embodiment of the present invention.

Referring to FIG. 3, the multi-antenna communication system may include a transmitter 100 and a receiver 120. The transmitter 100 may include a plurality of antennas 250. The receiver 120 may include one or more antennas 310 to receive a signal transmitted via a multipath channel 110.

In this example, when a number of the antennas 310 included in the receiver 120 is at least two, the multi-antenna communication system may correspond to a Multiple Input Multiple Output (MIMO) communication system. When the number of antennas 310 is only one, the multi-antenna communication system may correspond to a Multiple Input Single Output (MISO) communication system. The present invention may be applicable to both the MIMO communication system and the MISO communication system.

The receiver 120 may perform matched filtering of a pre-rake synthesized signal, received via the one or more antennas 310, using a matched filter 320. The receiver 120 may determine and output an output signal using a decision unit 330. Here, the matched filter 320 may match a reference signal and a code having a duration corresponding to a code-1-period duration.

When the number of antennas 310 included in the receiver 120 is at least two, the matched filter 320 may perform matched filtering using a matched filter bank or a Maximum Likelihood Detector (MLD).

Specifically, a spread-modulator 220 of the transmitter 100 may spread-modulate an input signal that is modulated in a first modulator 200. A pre-rake combiner 230 may perform pre-rake combining of a spread-modulated spread signal and thereby transmit. The transmitted transmission signal may be expressed by the following Equation 1:

$$\frac{1}{N}\sum_{l=0}^{L}\beta_l^* s_s(t - lT_c). \quad \text{[Equation 1]}$$

Here, $s_s(t)$ denotes a spread signal that is generated by spread-modulating the input signal $s(t)$ via the spread-modulator 220, $\beta_l$ denotes a time-inverted value of a channel impulse response, $\beta^*_l$ denotes a conjugated complex value of $\beta_l$, and N denotes a normalized parameter that is used to make power of a pre-rake combined output signal uniform. N may be given by the following Equation 2:

$$N = \left(\sum_{l=0}^{L-1} \beta_l \beta_l^*\right)^{\frac{1}{2}}. \quad \text{[Equation 2]}$$

As shown in the above Equation 1, the spread signal $s_s(t)$ may be combined with the time-inverted channel impulse response using the pre-rake combiner 230. The channel impulse response $h_k(t)$ of the multipath channel 110 may be expressed by the following Equation 3:

$$h_k(t) = \sum_{l=0}^{L-1} \beta_{k,l} \exp(j\Upsilon_{k,l})\delta(t - lT_c). \quad \text{[Equation 3]}$$

Here, L denotes a number of paths, and $\beta_{k,l}$ denotes a path gain and an independent identically distributed (IID) Rayleigh random parameter with respect to all k and l. $\gamma_{k,l}$ denotes a phase and may be uniformly distributed in $(0,\pi)$. $T_c$ corresponds to a first chip duration of spreading codes. It is assumed that $E[\beta_{k,l}]$ is 1.

In the case of a Time Division Duplex (TDD) system, it is assumed that the channel impulse response $h_k(t)$ are constant between an uplink time interval and a downlink time interval consecutive in an environment where a channel variation barely exists. In the uplink time interval, a base station may receive signals from mobile stations via a rake receiver and the like, and estimate the channel impulse response $h_k(t)$ with respect to a desired user k.

A received signal received at the receiver 120 in such a manner that the transmission signal of the above Equation 1 passes through the multipath channel 110 may be expressed by the following Equation 4:

$$\frac{1}{N}\sum_{j=0}^{L-1}\sum_{l=0}^{L-1}\beta_l^* \beta_{l-1-j} s_s(t - (l+j)T_c). \quad \text{[Equation 4]}$$

Here, the received signal may include a total of (2L−1) paths.

An output value of the matched filter 320 of the receiver 120 that is set for a path corresponding to $t=(L-1)T_c$ may be given by the following $$\frac{G}{N^2}\left(\sum_{l=0}^{L-1}\beta_l \beta_l^*\right)^2. \quad \text{[Equation 5]}$$

Here, G denotes a process gain.

When a Code Division Multiplexing (CDM)/Code Division Multiple Access (CDMA) communication system uses the channel impulse response $h_k(t)$ of the above Equation 3 and continuous orthogonal spreading codes with respect to the user k, the transmission signal $s_k(t)$ of the above Equation 1 may be expressed by the following Equation 6:

$$s_k(t) = \sqrt{\frac{2P}{U_k}} \sum_{l=0}^{L-1} \beta_{k,L-l-1} b_k(t - \quad \text{[Equation 6]}$$

$$lT_c)a_k(t - lT_c)\exp(jw(t - lT_c) - j\gamma_{k,L-l-1}).$$

Here, P denotes transmit power, ω denotes a carrier frequency, and $b_k(t)$ denotes a data column of the user k having a duration T modulated in the first modulator 200, and may express a current bit as $b^0_k$, a previous bit as $b^{-1}_k$, and a subsequent bit as $b^1_k$. $a_k(t)$ denotes continuous orthogonal spreading codes having a duration $T_c$ and a code length $$N = \frac{T}{T_c}.$$

Here, a waveform of a bit and a chip may be assumed as a square wave. $U_k$ denotes a normalized parameter and functions to make transmit power uniform regardless of a number of paths. $U_k$ may be expressed by the following Equation 7:

$$U_k = \sum_{l=0}^{L-1} \beta_{k,l}^2. \quad \text{[Equation 7]}$$

Hereinafter, a method of receiving and processing, at the receiver 120, a transmission signal will be described.

A pre-rake combined signal as shown in the above Equation 6 may be transmitted from the transmitter 100 or a base station, and may be input into the receiver 120 including $N_R$ multiple antennas in the downlink time interval. Here, $N_R (=1, 2, \ldots, M)$.

A signal $\gamma_i(t)$ received at the receiver 120 of a user i in the downlink time interval may be expressed using additive white Gaussian noise (AWGN) n(t) and the multipath channel 110, as given by the following Equation 8:

$$r_i(t) = n(t) + \text{Re} \sum_{k=1}^{K} \sum_{j=0}^{L-1} \beta_{i,j} s_k(t - jT_c) \exp(j\gamma_{i,j}).$$ [Equation 8]

Here, n(t) denotes an AWGN component with a power spectrum density of $N_0/2$.

When applying the above Equation 6 to the above Equation 8, a channel output including a total of (2L−1) paths may be obtained. A greatest peak value may be obtained in a path corresponding to (j+1=L−1) among the above (2L−1) paths.

The received signal may be multiplied by a weight vector and then be input into the matched filter 320. An expression of the weight vector to be multiplied will be omitted for ease of description.

The receiver 120 may receive and process the signal using a single matched filter for synchronization with the path corresponding to j+1=L−1. Therefore, a configuration of the receiver 120 may be simplified in comparison to an existing rake receiver that needs a matched filer for each path.

When i=1 is a matched user in the receiver 120, an output Z of a matched filter of the user 1 may be expressed by the following Equation 9:

$$Z = \int_{(L-1)T_c}^{(L-1)T_c + T} r_1(t) a_1[t - (L-1)T_c] \cdot \cos[\omega t - \omega T_c(L-1)] dt =$$

$$D + S + A + \eta.$$ [Equation 9]

Here, $\eta$ denotes a Gaussian random parameter with a variance of $N_0T/4$, D denotes a desired item in the received signal, S denotes a multipath interference (MPI), that is, self-interference, and M denotes multiple access interference (MAI), that is, multi-user interference.

Specifically, when k=1 and j+1=L−1 in the above Equation 8, D denotes a portion that is calculated with respect to the current bit $b_1^0$, and may be given by the following Equation 10:

$$D = \sqrt{\frac{P}{2}} b_1^0 T \sqrt{U_1}.$$ [Equation 10]

In a pre-rake system applying continuous orthogonal spreading codes, when a

MAI signal and an MPI signal exist within a predetermined time interval having the continuous orthogonal characteristic, an interference signal may be cancelled.

When applying k=1 and j+1≠L−1 to the above Equation 6, Equation 8, and Equation 9, S may be expressed by the following Equation 11:

$$S =$$ [Equation 11]

$$\sqrt{\frac{P}{2U_1}} \sum_{j=0}^{L-1} \sum_{m=0, m \neq j}^{L-1} \beta_{1,j} \beta_{1,m} \cos[wT_c(j-m) + \gamma_{1,m} - \gamma_{1,j}] \cdot$$

$$\int_0^T b_1[t - (j-m)T_c] a_1[t - (j-m)T_c] a_1(t) dt.$$

Here, $\int_0^T b_1(t-mT_c) a_1(t-mT_c) a_1(t) dt$ may be expressed by the following Equation 12:

$$\begin{cases} = T_c [b_k^{-1} C_{k,1}(m-N) + b_k^0 C_{k,1}(m)] & \text{for } m \geq 0 \\ = T_c [b_k^0 C_{k,1}(m) + b_k^1 C_{k,1}(N+m)] & \text{for } m < 0. \end{cases}$$ [Equation 12]

Here, $C_{k,i}(m)$ denotes a discrete aperiodic cross-correlation function.

When expressing $C_{i,i}$ as $C_i$ and using a relationship of $C_i(m) = C_i(-m)$, the following Equation 13 may be induced from the above Equation 11 and Equation 12:

$$S = \sqrt{\frac{P}{2U_1}} \sum_{j=0}^{L-2} \sum_{m=j+1}^{L-1} \beta_{1,j} \beta_{1,m} \cos[wT_c(j-m) + \gamma_{1,m} - \gamma_{1,j}] \cdot$$ [Equation 13]

$$T_c \{b_1^{-1} C_1(N - m + j) +$$

$$b_1^1 C_1(N - m + j)] 2 b_1^0 C_1(m - j)\}.$$

In the above Equation 13, since each of items has an independent phase value and has an average of "0" with respect to each j and m, the items may be uncorrelated.

Accordingly, a variance value of S may be given by the following Equation 14:

$$E[S^2 | \{\beta_{1,l}\}] =$$ [Equation 14]

$$\frac{PT_c^2}{2U_1} \sum_{j=0}^{L-2} \sum_{m=j+1}^{L-1} \beta_{1,j}^2 \beta_{1,m}^2 [C_1^2(N - m + j) + 2C_1^2(m - j)].$$

MAI A caused by another user may be induced by setting k>1 in the above Equation 6, Equation 8, and Equation 9, and may be expressed by the following Equation 15:

$$A = \sqrt{\frac{P}{2}} \sum_{k=2}^{K} \sum_{j=0}^{L-1} \sum_{m=0}^{L-1} \frac{\beta_{1,j} \beta_{1,m}}{\sqrt{U_k}} \cos[\omega T_c(j - m) +$$ [Equation 15]

$$\gamma_{k,m} - \gamma_{1,j}] \int_0^T b_k[t - (j-m)T_c] a_k[t -$$

$$(j-m)T_c] a_1(t) dt.$$

For m=j and m≠j, the above Equation 15 may be separately expressed by the following Equation 16 and Equation 17:

$$A|_{m=j} = \qquad \text{[Equation 16]}$$
$$T_c\sqrt{\frac{P}{2}}\sum_{k=2}^{K}\sum_{j=0}^{L-1}\frac{\beta_{1,j}\beta_{k,j}}{\sqrt{U_k}}\cos(\gamma_{k,j}-\gamma_{1,j})b_k^0 C_{k,1}(0),$$

and $$A|_{m\neq j} = \sqrt{\frac{P}{2}}\sum_{k=2}^{K}\sum_{j=0}^{L-2}\sum_{m=j+1}^{L-1}\frac{T_c}{\sqrt{U_k}}\cdot \qquad \text{[Equation 17]}$$
$$\{\beta_{1,j}\beta_{k,m}\cos[\omega T_c(j-m)+\gamma_{k,m}-\gamma_{1,j}]\cdot[$$
$$b_k^0 C_{k,1}(j-m)+b_k^1 C_{k,1}(N+j-m)]+$$
$$\beta_{1,m}\beta_{k,j}\cos[\omega T_c(m-j)+\gamma_{k,j}-\gamma_{1,m}]\cdot[$$
$$b_k^{-1} C_{k,1}(m-j-N)+b_k^0 C_{k,1}(m-j)]\}.$$

Here, all the phases within a cosine function are independent. Therefore, in the above Equation 16 and 17, each of items may have the average of "0" and all the items may be uncorrelated.

In particular, when using single-point orthogonal codes such as Walsh-Hadamard codes, a previous periodic correlation $[C_{k,i}(0)]$ of the above Equation 16 may become zeros. Accordingly, a variance value of the MAI A may be calculated as given by the following Equation 18:

$$E[A^2 | \{\beta_{1,l}\}] = \qquad \text{[Equation 18]}$$
$$\frac{PT_c^2 Q}{4}\sum_{k=2}^{K}\left\{WC_{k,1}^2(0)\sum_{m=0}^{L-1}\beta_{1,m}^2\sum_{j=0}^{L-2}\sum_{m=j+1}^{L-1}\beta_{1,j}^2[C_{k,1}^2(j-m)+C_{k,1}^2(N+j-m)]\cdot\right.$$
$$\sum_{j=0}^{L-2}\sum_{m=j+1}^{L-1}\beta_{1,m}^2[C_{k,1}^2(m-j-N)+$$
$$\left.C_{k,1}^2(m-j)]\right\}.$$

Here, an indication factor W may become zeros or $C_{k,j}(0)=0$ when orthogonal codes are used, and otherwise, W=1 and Q may be expressed by the following Equation 19:

$$Q = Q_{k,j} = E\left[\frac{\beta_{k,j}^2}{U_k}\right] = \frac{1}{L}, \text{ for } j = 0, 1, \ldots, L-1. \qquad \text{[Equation 19]}$$

Here, $Q_{k,0}+Q_{k,1}+\ldots+Q_{k,L-1}=1$, which matches the aforementioned condition to make the transmit power uniform.

Also, $C_{k,1}^{2Q}(m)$ included in the above Equation 14 and Equation 18 may be expressed using an expected value as given by the following Equation 20:

$$E[C_i^2(m)]=N-|m| \text{ for } m\neq n$$
$$E[C_{k,j}^2(m)]=N-|m|$$
$$E[C_{k,i}(m)C_{k,i}(n)]=0 \text{ for } m\neq n, k\neq i. \qquad \text{[Equation 20]}$$

When using general single-point orthogonal codes, random spreading codes may be used to induce the above Equation 20. However, as described above, the continuous orthogonal spreading codes such as zero correlation duration (ZCD) spreading codes, zero correlation zone (ZCZ) spreading codes, large area synchronous (LAS) spreading codes, and the like may be used as codes in the transmitter 100. In this case, a continuous orthogonal spreading duration may employ the following Equation 21:

$$E[C_i^2(m)]=0 \text{ for } m\neq n$$
$$E[C_{k,j}^2(m)]=0$$
$$E[C_{k,i}(m)C_{k,i}(n)]=0 \text{ for } m\neq n, k\neq i \qquad \text{[Equation 21]}$$

Hereinafter, a BER characteristic when the continuous orthogonal spreading codes are used in the transmitter 100 will be described with reference to FIG. 4. Although the ZCD spreading codes are used as an example for the continuous orthogonal spreading codes in FIG. 4, various types of examples may be applicable.

Figure 4:
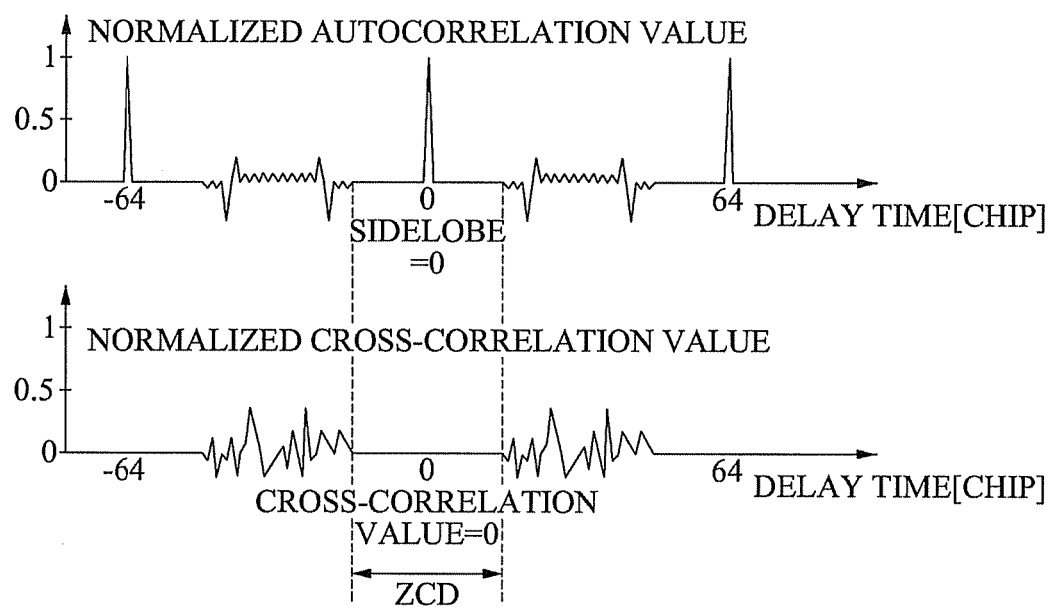
FIG. 4 is a diagram illustrating an autocorrelation characteristic and a cross-correlation characteristic of binary zero correlation duration (ZCD) spreading codes of a related art.

FIG. 4 is a diagram illustrating an autocorrelation characteristic and a cross-correlation characteristic of binary ZCD spreading codes according to a related art. A correlation characteristic of continuous orthogonal spreading codes will be described with reference to FIG. 4.

When two ZCD spreading codes $S_N^{(x)}=(s_0^{(x)}, \Lambda, s_{N-1}^{(x)})$ and $S_N^{(y)}=(s_0^{(y)}, \Lambda, s_{N-1}^{(y)})$ with a chip period N exist, a period correlation function and an aperiodic correlation function with respect to a time shift $\tau$ may be respectively given by the following Equation 22 and Equation 23:

$$\text{Periodic } R_{x,y}(\tau) = \sum_{n=0}^{N-1} s_n^{(x)} s_{(n+\tau, \bmod N)}^{(y)}, \qquad \text{[Equation 22]}$$

and $$\text{Aperiodic } R_{x,y}(\tau) = \sum_{n=0}^{N-\tau-1} s_n^{(x)} s_{(n+\tau)}^{(y)}. \qquad \text{[Equation 23]}$$

Here, $s_n^{(x)}$ and $s_n^{(y)}$ denote chips of the ZCD spreading codes, respectively.

The binary ZCD spreading codes and ternary ZCD spreading codes that have the continuous orthogonal characteristic may be generated, respectively, as given by the following Equation 24 and Equation 25:

$$\begin{cases} C_N^{(a)} = ABA - BAB - ABABA - B - A - BA - B \\ C_N^{(b)} = CDC - DCD - CDCDC - D - C - DC - D \\ \text{Here, } \begin{array}{l} A = (++-), B = (++-+), \\ C = (+-++), D = (+---) \end{array} \end{cases} \qquad \text{[Equation 24]}$$

and $$\begin{cases} C_N^{(a)} = \begin{array}{l} ABA - BZ_iAB - ABZ_iABA - BZ_i - \\ A - BA - BZ_i \end{array} \\ C_N^{(b)} = \begin{array}{l} CDC - DZ_iCD - CDZ_iCDC - DZ_i - \\ C - DC - DZ_i \end{array} \\ \begin{array}{l} A = (++-), B = (++-+), \\ \text{Here, } C = (+-++), D = (+---), \\ Z_i = \text{Inserted } zedos \end{array} \end{cases} \qquad \text{[Equation 25]}$$

In the above Equation 24 and Equation 25, N denotes a spreading code period, "+" denotes "+1", "−" denotes "−1", each of A, B, C, and D denotes a chip configuration including "+1" and "−1" within the spreading codes, and $Z_i$ denotes a number of zeros inserted into the ternary ZDC spreading codes.

A maximum ZCD of the binary ZCD spreading codes generated using the above Equation 24 may be 0.5N+1, and a maximum ZCD of the ternary ZCD spreading codes generated using the above Equation 25 may be 0.75N+1.

FIG. 4 shows autocorrelation function values and cross-correlation function values of a pair of binary ZCD spreading codes with the 64-chip period. Here, it can be known from FIG. 4 that cross-correlation values of the two ZCD spreading codes become zeros in a duration corresponding to 33 chips that are N/2+1 of 64 chips. Also, it can be known from FIG. 4 that autocorrelation values become zeros in sidelobes around a peak of the autocorrelation function within the above duration.

Hereinafter, a BER characteristic of a multi-antenna communication system applying a pre-rake scheme with respect to spreading codes having a characteristic of being continuously orthogonal for a predetermined time interval, and applying a use of multiple antennas for an interference cancellation and a high-rate transmission will be described.

A communication system using a random spread parameter may apply the above Equation 20 with respect to $C^2_{k,1}(m)$. Accordingly, when it is assumed that the above Equation 20 is applied to the above Equation 14 and the above Equation 18, a receiver output Z of the above Equation 9 is a Gaussian random parameter, and a binary phase shift keying (BPSK) modulation having a condition of $\{\beta_{1,n}, n=0, 1, \ldots, L-1\}$ is performed in the first modulator 200, the BER characteristic may be expressed by the following Equation 26:

$$P(e|\{\beta_{1,n}\}) = 0.5 \; erfc(\sqrt{\sqrt{Y}}). \quad \text{[Equation 26]}$$

Here, Y denotes a signal-to-interference plus noise ratio (SINR) including noise and interference and is given by $$Y = \frac{D^2}{2\text{var}(Z)},$$

and var(Z) denotes a variance of the Gaussian random parameter Z. Accordingly, Y may be expressed by the following Equation 27:

$$Y = \left[\frac{L}{\overline{\gamma_b}U_1} + \frac{4\chi}{NU_1^2} - \frac{2\mu}{N^2U_1^2} + \frac{(K-1)(L-1)}{NL}\right]^{-1}. \quad \text{[Equation 27]}$$

Here, $$\overline{\gamma_b} = \frac{PTL}{N_o}$$

denotes an average of a received SINR, and $\chi$ and $\mu$ associated with MPI S may be expressed by the following Equation 28:

$$\chi = \sum_{j=0}^{L-2} \sum_{m=j+1}^{L-1} \beta_{1,j}^2 \beta_{1,m}^2 \quad \text{[Equation 28]}$$

$$\mu = \sum_{j=0}^{L-2} \sum_{m=j+1}^{L-1} (m-j)\beta_{1,j}^2 \beta_{1,m}^2.$$

As shown in the above Equation 28, in the case of a communication system using random spread codes, when a number of multiple paths L and a number of users k increase, interference may increase and the SINR Y may decrease. Accordingly, a performance of the communication system may be deteriorated.

However, according to an embodiment of the present invention, when using spreading codes having the continuous orthogonal characteristic, the above Equation 21 may be applied to the above Equation 14 and the above Equation 18. Accordingly, all the interference components may become zeros whereby the above Equation 27 may be arranged to the following Equation 29:

$$Y = \left[\frac{L}{\overline{\gamma_b}U_1}\right]^{-1}. \quad \text{[Equation 29]}$$

Specifically, both S corresponding to the MPI and A corresponding to the MAI become zero whereby all the interference effect may be removed.

Hereinafter, a method of transmitting and receiving a signal in the multi-antenna communication system constructed as above according to an embodiment of the present invention will be described.

Figure 5:
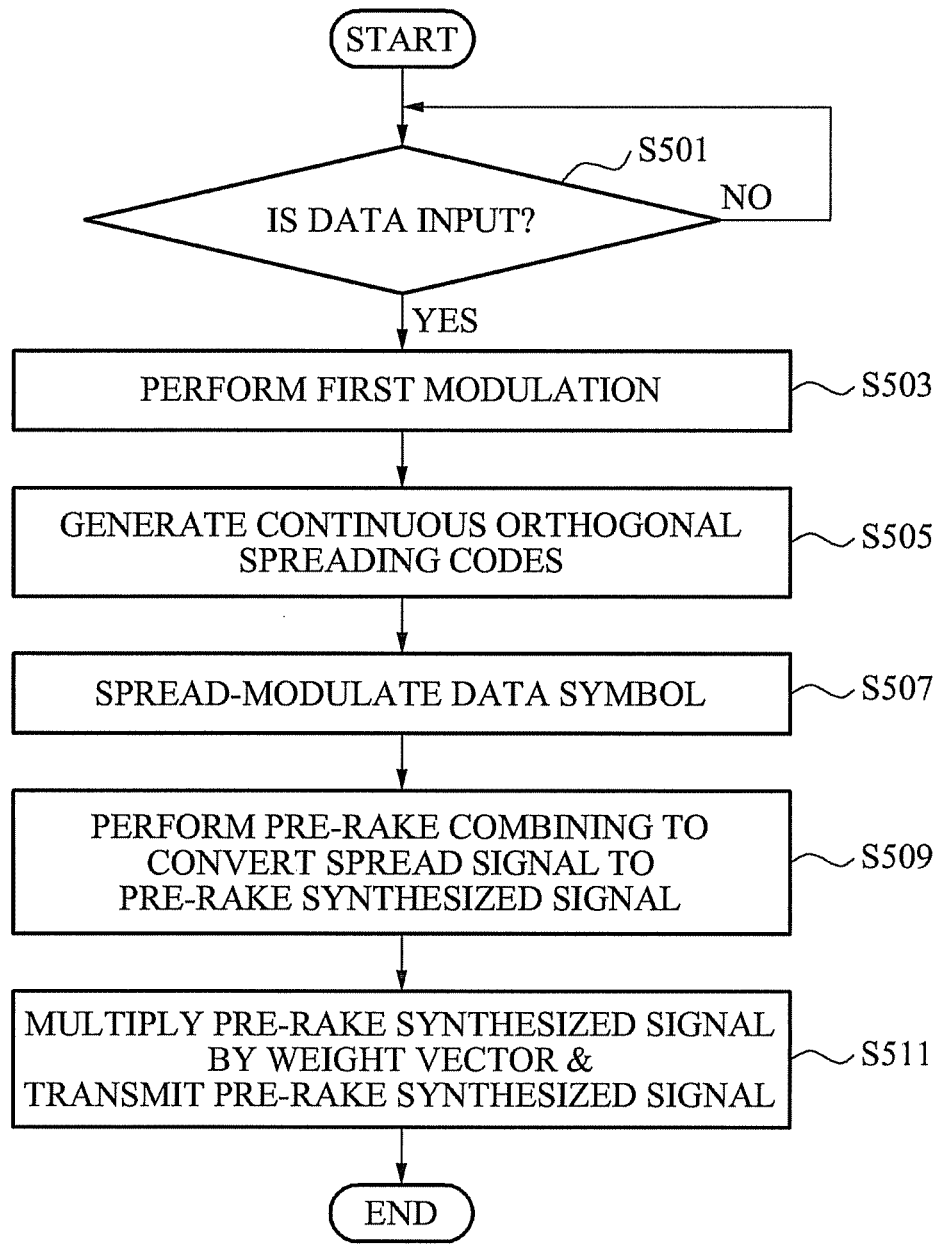
FIG. 5 is a flowchart illustrating a method of transmitting a signal in a transmitter of a multi-antenna communication system according to an embodiment of the present invention.

FIG. 5 is a flowchart illustrating a method of transmitting a signal in a transmitter of a multi-antenna communication system according to an embodiment of the present invention.

Here, a transmission apparatus may correspond to the transmitter of the multi-antenna communication system. Referring to FIG. 5, when the transmission apparatus receives data to be transmitted in operation S501, the transmission apparatus may perform a first modulation of the received data using various types of digital modulation schemes, for example, a PSK modulation scheme, a QPSK modulation scheme, a QAM scheme, and the like in operation S503.

In operation S505, the transmission apparatus may generate continuous orthogonal spreading codes. In operation S507, the transmission apparatus may spread-modulate a data symbol value of the first modulated data using the continuous orthogonal spreading codes.

In operation S509, the transmission apparatus may perform pre-rake combining of a spread-modulated spread signal to generate a pre-rake synthesized signal. In operation S511, the transmission apparatus may multiply the pre-rake synthesized signal by a weight vector corresponding to each of multiple antennas, and thereby transmit the pre-rake synthesized signal via each of the multiple antennas.

Figure 6:
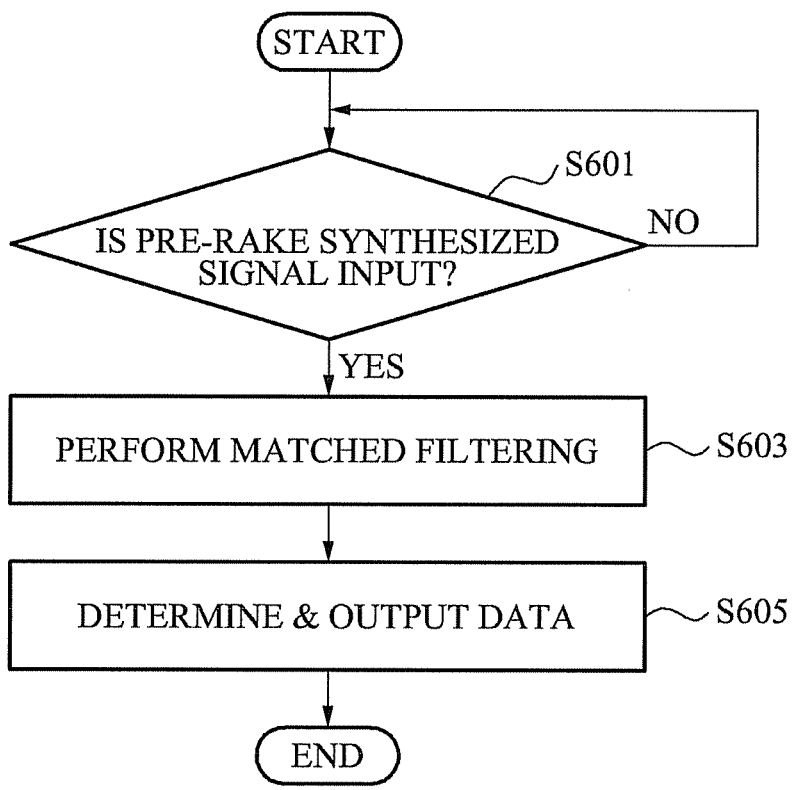
FIG. 6 is a flowchart illustrating a method of receiving a signal in a receiver of a multi-antenna communication system according to another embodiment of the present invention.

FIG. 6 is a flowchart illustrating a method of receiving a signal in a receiver of a multi-antenna communication system according to an embodiment of the present invention.

Here, a reception apparatus may correspond to the receiver of the multi-antenna communication system. When the reception apparatus receives a pre-rake synthesized signal via at least one antenna in operation S601, the reception apparatus may perform matched filtering of the pre-rake synthesized signal in operation S603. In operation S605, the reception apparatus may determine and output output data from the matched filtered pre-rake synthesized signal.

The signal transmission/reception method of the multi-antenna communication system according to the above-described exemplary embodiments of the present invention may be recorded in computer-readable media including program instructions to implement various operations embodied by a computer. The media may also include, alone or in combination with the program instructions, data files, data structures, and the like. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of transmitting a signal via a multipath channel in a multi-antenna communication system, the method comprising:
generating continuous orthogonal spreading codes;
spread-modulating a user signal using the continuous orthogonal spreading codes to generate a spread signal;
performing pre-rake combining of the spread signal to generate a pre-rake synthesized signal with a time-inverted value of a channel impulse response; and
multiplying the pre-rake synthesized signal by a weight vector corresponding to each of multiple antennas to thereby transmit the pre-rake synthesized signals via the multiple antennas,
wherein the continuous orthogonal spreading codes have a characteristic of being continuously orthogonal for a predetermined time interval and the predetermined time interval indicates an amount of time used to traverse a major delay path length of multipath interference.

2. The method of claim 1, wherein an autocorrelation value and a cross-correlation value of the continuous orthogonal spreading codes are zeros during a predetermined time interval.

3. The method of claim 1, wherein the continuous orthogonal spreading codes include multi-phase continuous orthogonal codes and multi-level continuous orthogonal codes.

4. A method of receiving a signal via a multipath channel in a multi-antenna communication system, the method comprising:
receiving, via the multipath channel, a pre-rake synthesized signal with a time-inverted value of a channel impulse response that is pre-rake combined using at least one antenna; and
performing matched filtering of the pre-rake synthesized signal with respect to at least one path,
wherein the pre-rake synthesized signal is generated by performing pre-rake combining of a user signal that is spread-modulated using continuous orthogonal spreading codes,
wherein the pre-rake synthesized signal is multiplied by a weight vector corresponding to each of multiple antennas to thereby transmit the pre-rake synthesized signals via the multiple antennas, and
wherein the continuous orthogonal spreading codes have a characteristic of being continuously orthogonal for a predetermined time interval and the predetermined time interval indicates an amount of time used to traverse a major delay path length of multipath interference.

5. An apparatus for transmitting a signal via a multipath channel in a multi-antenna communication system, the apparatus comprising:
a continuous orthogonal spreading code generator to generate continuous orthogonal spreading codes;
a spread-modulator to spread-modulate a user signal using the continuous orthogonal spreading codes, and to generate a spread signal;
a pre-rake combiner to perform pre-rake combining of the spread signal, and to generate a pre-rake synthesized signal with a time-inverted value of a channel impulse response; and
a multiplier to multiply the pre-rake synthesized signal by a weight vector corresponding to each of multiple antennas to thereby transmit the pre-rake synthesized signals via the multiple antennas,
wherein the continuous orthogonal spreading codes have a characteristic of being continuously orthogonal for a predetermined time interval and the predetermined time interval indicates an amount of time used to traverse a major delay path length of multipath interference.

6. The apparatus of claim 5, wherein the pre-rake combiner combines the spread signal with a channel impulse response with respect to the multipath channel.

7. The apparatus of claim 5, wherein an autocorrelation value and a cross-correlation value of the continuous orthogonal spreading codes are zero during a predetermined time interval.

8. The apparatus of claim 5, wherein the continuous orthogonal spreading codes include multi-phase continuous orthogonal codes and multi-level continuous orthogonal codes.

* * * * *